Figure 1:
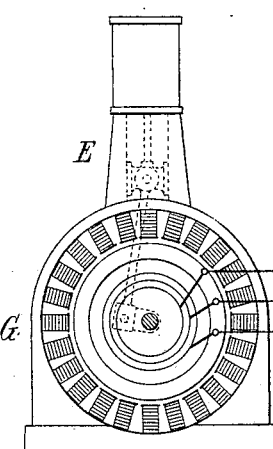
Figure 1:
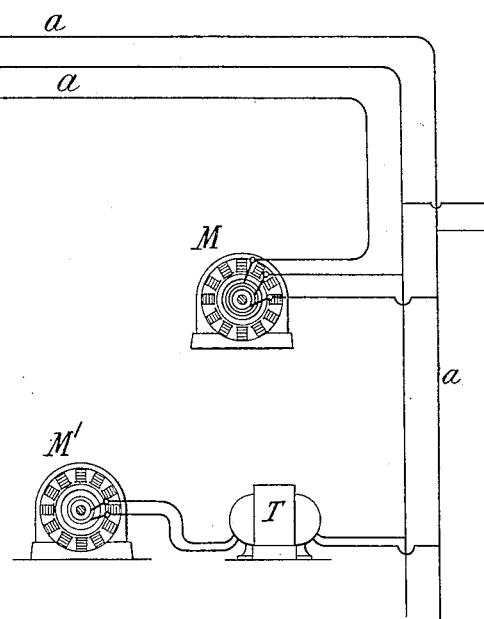

No. 707,390. Patented Aug. 19, 1902.
A. CHURCHWARD.
SYNCHRONOUS ALTERNATING CURRENT MOTOR.
(Application filed Jan. 11, 1899. Renewed Feb. 21, 1901.)

(No Model.) 2 Sheets—Sheet 1.

WITNESSES:
Fred White
René Bruine

INVENTOR:
Alexander Churchward,
By his Attorneys,
Arthur C. Fraser & Co.

No. 707,390. Patented Aug. 19, 1902.
A. CHURCHWARD.
SYNCHRONOUS ALTERNATING CURRENT MOTOR.
(Application filed Jan. 11, 1899. Renewed Feb. 21, 1901.)

(No Model.) 2 Sheets—Sheet 2.

WITNESSES:
Fred White
René Bruine

INVENTOR:
Alexander Churchward,
By his Attorneys,
Arthur C. Fraser &Co

UNITED STATES PATENT OFFICE.

ALEXANDER CHURCHWARD, OF FORT WAYNE, INDIANA.

SYNCHRONOUS ALTERNATING-CURRENT MOTOR.

SPECIFICATION forming part of Letters Patent No. 707,390, dated August 19, 1902.

Application filed January 11, 1899. Renewed February 21, 1901. Serial No. 48,279. (No model.)

*To all whom it may concern:*

Be it known that I, ALEXANDER CHURCHWARD, a citizen of the United States, residing at Fort Wayne, in the county of Allen and State of Indiana, have invented certain new and useful Improvements in Synchronous Alternating Motors, of which the following is a specification.

The object of this invention is to overcome the difficulties encountered in operating synchronous alternating-current motors when the dynamo or generator fluctuates in speed in different parts of a revolution, as occurs when the generator is driven by an engine the propulsive thrust of which varies at different periods of such revolution.

It is commonly said that the speed of two alternating dynamos that are run in synchronism is definitely fixed by their relative numbers of field-poles, so that the two armatures make the same number of alternations per minute. It is in addition practically important that the two armatures maintain the same relative speed at all times. Thus if the generator is driven (by direct connection or otherwise) from an engine the speed of which varies at different parts of a revolution, so that the same variations in speed are communicated to the generator, and is connected in circuit with a second machine which runs at practically uniform speed (by having a very heavy fly-wheel or by its armature acting as a fly-wheel) it will follow that the phases of the two machines will be at times coincident, while at other times one machine may be in advance of or behind the other.

A synchronous motor that is connected to a circuit on which the rapidity of alternation fluctuates at regular intervals tends to "pump"—that is, its armature runs sometimes a little faster and sometimes a little slower than the generator—with the result of causing a beating sound in the motor. Such pumping or beating action is usually indicative of some irregularity in the circuit feeding the motor. This irregularity may consist of variations either in speed or in electromotive force. The variation in speed of the generator tends to cause a corresponding variation in the speed of a synchronous motor. The motor cannot, however, assume instantly the speed required by the new speed of the generator. When the speed of the generator increases, the motor-armature begins to increase in speed; but by reason of its lagging the motor receives an increased current, because its armature is not in normal position for the new frequency and because additional current is required for supplying the energy necessary for increasing its speed. This additional current produces a difference of magnetism of the field, which must again be altered when the generator speed decreases below the average. The motor is therefore undergoing a slight variation in speed, which seeks to approximate to but does not exactly correspond with that of the generator. This pumping or rocking, however, will almost entirely disappear when even a small load is put on the motor. It has heretofore been the custom to weaken the field of a synchronous motor when it was found to pump. The effect of this is to lower the electromotive force of the motor, thereby putting an artificial load on the armature, which, however, while it reduces the pumping has the disadvantage of reducing the electromotive force of the generator and of upsetting the line. To overcome this defect and avoid interference with the line is the purpose of my invention.

According to this invention I apply on the shaft of the motor or on a shaft driven therefrom a fly-wheel of suitable weight, which instead of being fixedly connected to the motor in the usual manner is connected thereto through the medium of a yielding connection in the nature of a friction-brake. The effect of this fly-wheel is to prevent the objectionable pumping action referred to. If the generator speed suddenly increases, the armature tends to correspondingly accelerate its speed; but the fly-wheel lags behind, thereby putting a slight load on the motor, and then when the generator slows down the motor-armature tends to run slower, while the fly-wheel, tending to run at a uniform speed, catches up with the motor-shaft and forces it ahead or resists its tendency to slow down, thereby again putting a slight load on the motor. I have already stated that putting a slight load on a synchronous motor extinguishes the pumping effect, this being equally true whether it is electrical, by weakening the field and taking extra current, or is mechanical, by throwing some additional work upon the motor. The yieldingly-connected flywheel provided by my invention is of the latter order and has the effect of causing the motor to run without any pumping. Inasmuch as the load imposed by the fly-wheel is felt only at the instants when the variation in speed occurs, its effect in correcting the pumping is accompanied by less loss of energy than with a load which imposes a continuous drag on the motor.

Having thus set forth the principle of my invention, I will now proceed to describe in detail the mode of applying the same with reference to the accompanying drawings, wherein—

Figure 2:
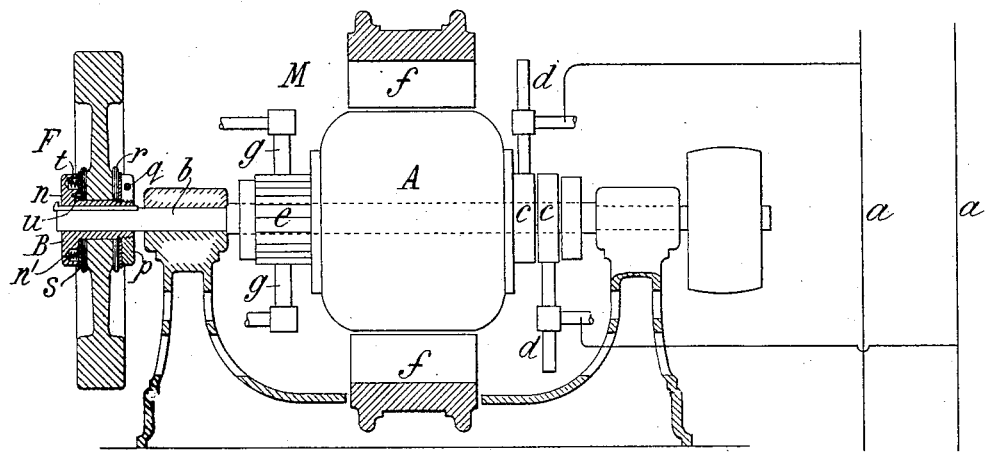
Figure 3:
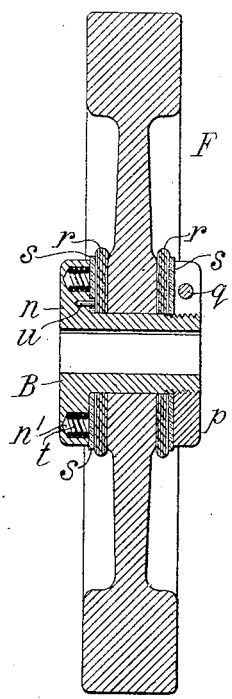
Figure 4:
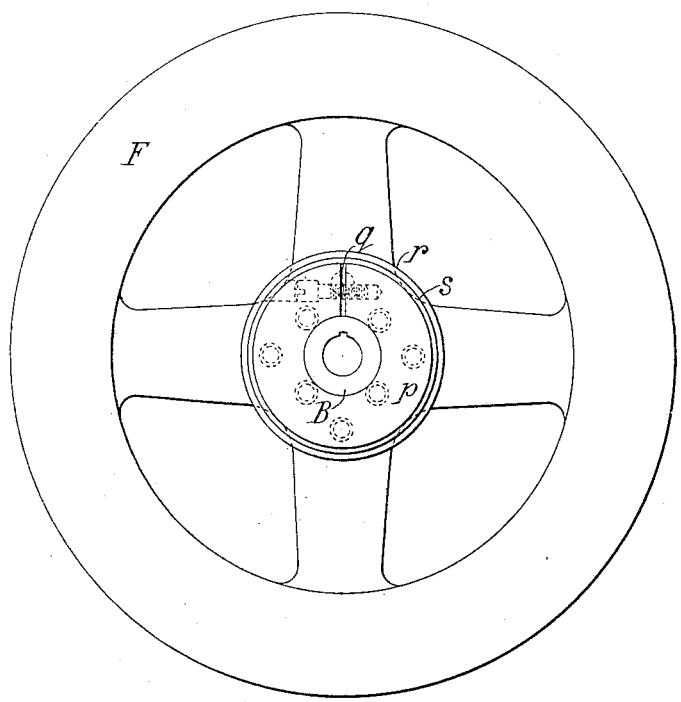
Figure 5:
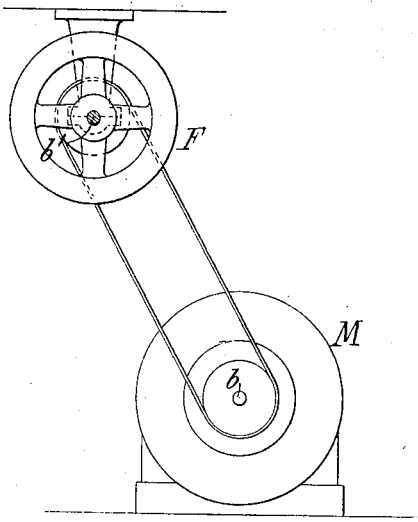
Figure 6:
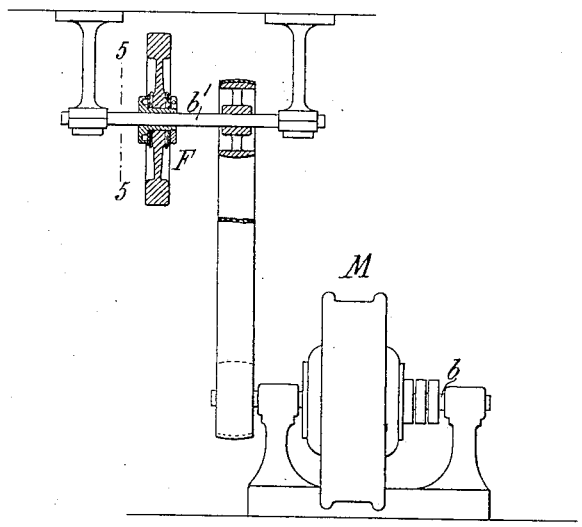

Figure 1 is a diagrammatic view showing the generator and motor and their circuit connections. Fig. 2 is a sectional elevation of the motor. Fig. 3 is a diametrical section of the fly-wheel, showing the frictional connection. Fig. 4 is a face view thereof. Fig. 5 is a side elevation illustrating a modification. Fig. 6 is a front elevation of the same.

According to Fig. 1, let G designate an alternating-current generator, (single or multi phase,) and $a\ a$ the circuit fed therefrom. I have shown this generator as driven by a direct-connected steam-engine E. M and M' are synchronous motors. The motors may have the same number of poles as the generator or a different number, as is well understood. The motor M, I have shown as directly connected to the circuit $a$, while the motor M', I have shown as connected through a transformer T. To avoid complication in the diagram, I have not shown the means for exciting the field-magnets of the generator and motors and have also omitted all electrical accessories, such as starting-switches, &c.

In Fig. 2 I have shown an alternating motor of well-known type, of which $f$ is the field-magnet, A is the armature, $b$ is the armature-shaft, $c\ c$ are the collector-rings, and $d\ d$ are the brushes leading the alternating current into these rings. I have shown this machine as constructed with a commutator $e$ for feeding continuous current to brushes $g\ g$ for the purpose of exciting the field-magnets; but these exciting connections not being material to my invention are not shown.

Referring to Fig. 2, on the armature-shaft $b$ (or any other shaft driven therefrom) is mounted a fly-wheel F. Preferably the fly-wheel is mounted upon a sleeve B, which itself is keyed or otherwise fixed upon the shaft. The yielding frictional connection between the fly-wheel and shaft is in such case interposed between the fly-wheel and the sleeve. This frictional connection may be variously constructed, but is essentially in the nature of a friction-brake carried by one part and bearing upon the other. The construction shown in Figs. 3 and 4 is preferable. Here the sleeve B is formed on one end with a flange or collar $n$, while its opposite end receives a detachable and adjustable collar $p$, connected, preferably, by screwing it upon the threaded end of the sleeve, the collar being split on one side and its split portion provided with a clamping-screw $q$, by which to contract the collar upon the screw-threads to lock it in place in a well-known manner. The hub of the fly-wheel F is confined between the collars $n$ and $p$, friction disks or washers $r\ r$, preferably of rawhide, being placed against opposite faces of the hub and metal washers $s\ s$ being preferably placed outside of these disks against the respective collars. The collar $n$ has a series of sockets $n'$, in which are confined stiff springs $t\ t$, which tend to press the plate $s$ against the hub of the fly-wheel, and thereby generate a degree of friction between the fly-wheel and sleeve, the frictional retardation being adjustable by screwing up more or less the collar $p$. A pin $u$, entering a hole in the disk $r$, compels the latter to turn with the sleeve. The construction thus described enables the motor-shaft to turn independently of the fly-wheel, but resists this turning in either forward or backward direction to an extent dependent upon the amount of friction generated in the friction-brake, and it is the amount of this friction that determines the load that the fly-wheel imposes upon the motor. The power expended in overcoming this friction is of course lost; but as this loss occurs only when the fluctuations in speed occur instead of continuously, as when a mechanical load is put upon the motor, this loss is greatly reduced.

Instead of applying the fly-wheel directly on the motor-shaft it may be applied on any shaft driven by the motor. Thus in Figs. 5 and 6 I have shown the motor belted to a counter-shaft $b'$ and the fly-wheel F carried on this counter-shaft, the construction being otherwise exactly the same as before described. In applying the construction shown in Fig. 6 I prefer to introduce the frictional connection between the fly-wheel F and its shaft $b'$ and prefer to construct it in the manner already described. Instead, however, the frictional connection may be interposed at any point between the fly-wheel F and the motor-armature. I have even utilized the belt by which the counter-shaft $b'$ is driven from the armature-shaft $b$ as the frictional connection by adjusting its slack to a nicety, so as to give it just the amount of slip necessary to impart the requisite friction; but owing to the difficulty of maintaining such nice adjustment in the case of a belt running over pulleys I do not recommend this means for practical use, but prefer the construction of disk frictional connection already described.

Where a rotary transformer is used for converting an alternating to a direct current, there is some pumping action, as before described, and my invention is applicable in the same manner. Since such rotary transformer involves a synchronous motor as one of its elements, it will be understood that wherever such motor is herein referred to this element of a rotary transformer will be understood as included to the same effect as though in each instance I had referred to a "synchronous motor or rotary transformer." Fig. 2 may be understood as showing a rotary transformer of that class wherein the armature A is wound with both the alternating winding essential to a synchronous motor and with the continuous-current winding essential to the generating-armature of a rotary transformer, the collector-rings $c$ $c$ being connected with the terminals of the alternating winding and the commutator-segments $e$ being connected with the terminals of the continuous winding, so that the continuous current is taken off at the brushes $g$ $g$.

My present invention is closely related to that claimed in my application, Serial No. 692,373, filed October 1, 1898. In that application I have described the same general system for preventing the objectionable pumping action of synchronous alternating motors and have claimed, broadly, the combination, with such motor, of a fly-wheel driven thereby through the medium of a yielding connection and have also claimed, specifically, a particular construction of yielding connection involving springs interposed between the fly-wheel and shaft. The frictional yielding connection, to which my present application is limited, is one of the species included within the generic claim or claims of my said application.

I claim as my invention the following-defined novel features, substantially as hereinbefore specified, namely:

1. The combination with a synchronous motor of a fly-wheel driven thereby through the medium of a yielding frictional connection for producing the effect described.

2. The combination with a synchronous motor of a fly-wheel driven thereby, free to turn on its driving-shaft, and a yielding frictional connection between such fly-wheel and the motor, for producing the effect described.

3. The combination with a synchronous motor of a fly-wheel driven thereby, free to turn on its driving-shaft, and connected thereto by means of an adjustable friction-brake.

4. The combination with a synchronous motor of a fly-wheel driven thereby, free to turn on its driving-shaft, and a yielding frictional connection between said fly-wheel and its shaft consisting of friction-plates and springs pressing said plates together.

5. The combination with a synchronous dynamo-electric machine, of a fly-wheel driven thereby through the medium of a yielding frictional connection for producing the effect described.

6. The combination with a synchronous dynamo-electric machine, of a load operated thereby through the medium of a yielding frictional connection and tending to maintain speed independently of the dynamo.

7. The combination with a rotary converter, of a fly-wheel driven thereby through the medium of a yielding frictional connection for producing the effect described.

8. The combination with a rotary converter, of a load operated thereby through the medium of a yielding frictional connection, said load tending to maintain speed independently of the converter.

In witness whereof I have hereunto signed my name in the presence of two subscribing witnesses.

ALEXANDER CHURCHWARD.

Witnesses:
CHARLES C. MILLER,
JAMES J. WOOD.